United States Patent

Lynch, Jr. et al.

[15] 3,639,280
[45] Feb. 1, 1972

[54] AIR FILTER COATING COMPOSITIONS CONTAINING MIXTURE OF SILICA AND MAGNESIUM SILICATE GELLING AGENTS

[72] Inventors: Charles Andrew Lynch, Jr., Severna; James P. Hamilton, Pasadena, both of Md.

[73] Assignee: FMC Corporation, New York, N.Y.

[22] Filed: Sept. 28, 1967

[21] Appl. No.: 671,222

[52] U.S. Cl. .................................252/88, 23/110, 23/182, 252/184, 252/317
[51] Int. Cl. ................C01b 33/14, C01b 33/22, C09k 3/22
[58] Field of Search ...................252/88, 184, 315, 316, 317, 252/351, 352, 437, 449, 259.5, 309; 106/287, 177, 288; 23/182, 110; 96/35.1

[56] References Cited

UNITED STATES PATENTS 3,297,460  1/1967  Rau et al. ............................106/287 X
3,458,393  7/1969  Battista ..............................106/287 X Primary Examiner—John T. Goolkasian
Assistant Examiner—M. E. McCamish
Attorney—Milton Zucker, Eugene G. Seems and Charles C. Fellows

[57] ABSTRACT

This application discloses triorganic phosphate coating compositions for viscous-impingement air filters in which the triorganic phosphate is thickened by a combination of about 0.1 to 1.0 parts of a magnesium silicate, with at least 10 percent of its particles which are less than 1 micron in any dimension and whose silica to magnesia ratio is about 1.05 to about 1.30 to 1, and 0.1 to 3 parts of pyrogenic silica having a particle size no greater than 0.025 microns. These gel compositions have good high-temperature viscosity stability and exhibit low syneresis losses. Satisfactory gels can be prepared using as little as one percent pyrogenic silica with 0.5 percent of the magnesium silicate.

3 Claims, No Drawings

AIR FILTER COATING COMPOSITIONS CONTAINING MIXTURE OF SILICA AND MAGNESIUM SILICATE GELLING AGENTS

BACKGROUND OF THE INVENTION

1. Field of the Invention

This invention relates to novel, bodied, thixotropic triorganic phosphate gel compositions suitable for coating dust filter media in air filters.

2. Description of the Prior Art

Viscous-impingement-type industrial air filters contain porous filter media, or mats, through which air is passed. The filter medium is coated with a stable, nonvolatile liquid which entraps dust particles as air is passed through the filter and prevents the dust particles from becoming reentrained in the air stream. However, loss of this liquid coating during use results in a lowering of the air cleaning capacity of the filter. The liquid may be blown off the filter media by high-air velocities, encountered, for example, with diesel engine filters. Moreover, when a filter medium is tightly wound around spools, as in the recently developed automatic replacement filters, the liquid tends to be squeezed out of the filter media.

In the past, these losses have been reduced by bodying the liquid with a semisoluble resin or other gelling agent. However, these resin-liquid compositions tend to decrease in viscosity at elevated temperatures, especially at the temperatures reached with diesel engine filters. If gelling agents, such as finely divided silica are used, as much as 7 percent, based on the mixture, is ordinarily required for satisfactorily thickening a suitable liquid such as a triorganic phosphate. This amount of silica in the liquid can clog spray nozzles and associated filters generally used in coating the mats. Furthermore, the mixture becomes thicker upon aging due to syneresis resulting in the reduction of the ability to entrap dust particles. Syneresis may also occur during storage causing the liquid to separate from the gel structure. The separated triorganic phosphate will then drain out of the mat leaving a higher concentration of gel solids on the surface of the mat. The overall effect is a loss in dust filtering capacity.

Excellent triorgano-phosphate gels at lower silica levels for use on viscous-impingement-type air filters can be prepared by using surfactants with low levels of silica, as described in U.S. Pat. No. 3,297,460.

SUMMARY OF THE INVENTION

We have now discovered improved coating compositions for viscous-impingement air filters which comprise: (a) 100 parts by weight of a triorganic phosphate of the formula

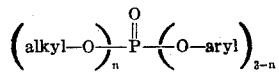

in which $n$ is 0–1, the alkyl radical is of one to 10 carbon atoms and the aryl radical is derived from tar acids; (b) 0.1–3 parts by weight of substantially pure pyrogenic silica having a particle size not greater than 0.025 microns and (c) 0.1 to 1.0 parts by weight of a magnesium silicate which has at least 10 percent of the particles less than 1 micron in any dimension and a silica to magnesia ($SiO_2$:$MgO$) ratio of 1.05 to 1.30 to 1. The pyrogenic silica alone does not thicken the triorganic phosphate sufficiently to form satisfactory coating compositions. Triorganic phosphate compositions containing pyrogenic silica and component (c) are thickened enough to be useful as coatings for air filter media that do not drain from the filter at room temperature and maintain a sufficiently high viscosity at elevated temperatures to perform satisfactorily. We have evaluated a number of combinations of the pyrogenic silica and magnesium silicate and have produced satisfactory gels with as little as 1 percent pyrogenic silica and 0.5 percent by weight of magnesium silicate. Quite surprisingly, air filters coated with gel compositions made using the combination of gellants, pyrogenic silica and magnesium silicate, have unexpectedly low syneresis losses and very good high-temperature viscosity stability; this is very surprising since the pyrogenic silica alone is a very inefficient gellant, and compositions gelled with a magnesium silicate alone have high-syneresis losses.

DESCRIPTION OF THE INVENTION AND THE PREFERRED EMBODIMENTS

The triorganic phosphates which were useful in accordance with this invention are those having the formula

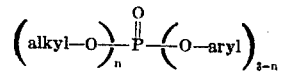

in which $n$ is 0–1, the alkyl radical is 1 to 10 carbon atoms and the aryl radical is derived from tar acid. The term "tar acid" is intended to include those acids which can be extracted with dilute caustic soda from tars, such as coal tar, common wood tar, petroleum tar and lignite tar. Crude tar acid extracts usually contain phenol, ortho-cresol, meta-cresol, para-cresol and isomeric xylenols, and they can be fractionated to give various grades of these products. Triorganic phosphates of particular use practicing this invention are termed tricresyl phosphates. The term "tricresyl phosphate" is intended to include esters made from phosphorus oxychloride and mixtures of alkylphenols known as "cresylic acids" which may be derived from coal tar, wood tar or petroleum distillate. Suitable alkyl radicals include methyl, ethyl, propyl, iso-propyl, butyl, amyl, isohexyl and ethylhexyl, as well as others. Preferably the phosphate is tricresyl phosphate.

The silica that we used in preparing the high-viscosity compositions of this invention is of that type known as "pyrogenic silica." This type of silica is prepared by reacting almost pure silicon tetrachloride and water in a vapor phase to produce silicon dioxide and hydrogen chloride. The silica so produced is a very pure powder, of the order of 99 percent pure having a particle size not greater than about 0.025 microns. Pyrogenic silica having particle sizes as small as about 0.007 microns is presently available and useful in practicing this invention. Preferably, the pyrogenic silica has a particle size of about 0.015 to 0.020 microns.

Magnesium silicates useful in preparing the compositions of this invention are described in U.S. application Ser. No. 436,304, filed Mar. 1, 1965 abandoned in favor favor of continuation-in-part application Ser. No. 701,838 which is now U.S. Pat. No. 3,458,393. The magnesium silicates described in this patent application have at least 10 percent of the particles less than 1 micron in any dimension and have an $SiO_2$:$MgO$ ratio in the range of between 1.05 to 1 and 1.30 to 1. In all cases it is necessary that the magnesium silicate contain about 10 percent by weight of particles of submicron particle size in all dimensions. We have found 0.1 to 1 parts magnesium silicate to give useful compositions. Higher levels of magnesium silicate can be used, however the gels are too viscous for application by conventional techniques.

The coating compositions of this invention were prepared by dispersing the gelling agents in the triorganic phosphate in a high-speed laboratory blender for a short period of time, sometimes as short as 1.5 minutes. As far as is known, any method of dispersing solids in liquids to produce coating compositions of this type may be used in practicing this invention.

A small amount of a surface active agent incorporated in a coating composition of this invention will increase the viscosity of the composition. This permits the use of less gellant to obtain a desired viscosity. As little as 0.1 percent by weight, based on the total weight of the mixture, results in some viscosity improvement; however, 0.3 to 2.0 surface active agent is preferred. Use of 2.5 percent or more of a surface active agent results in useful coating compositions, however the high viscosities obtained are not generally required for commercial use, and thus in most cases, the additional cost is not warranted.

As the surface active agent, nonionic surfactants, such as polyoxyethylene sorbitan monooleate, polyoxyethylene sorbitan tristearate and sorbitan monostearate, and cationic surfactants, such as alkyl-trimethylammonium chloride, dialkyl dimethylammonium chloride, octadecenyl trimethylammonium chloride, and tetraethylammonium bromide, are extremely effective in increasing viscosity of the organic phosphate composition containing the pyrogenic silica and magnesium silicate gelling agents. Glycols, such as ethylene glycol and propylene glycol and polyglycols such as polyethylene glycols and polypropylene glycols are also suitable surface active agents for this invention. A minor quantity of water in the gelled organic phosphate compositions of this invention also increases the viscosity of the gel. If an anionic surfactant is used, a small amount of water must be present. Glycerol is also an effective surface active agent. If it is desired, mixtures of different surface active agents may be used. In all of these surfactant treated gels, the viscosity increase is stable for many days.

The following examples, illustrating the novel filter medium coating compositions of this invention, are presented with no intent that the invention be limited thereto. All parts and percentages are by weight. For comparison, the ungelled tricresyl phosphate used in the examples had a viscosity of approximately 120 cps. at room temperature.

EXAMPLE 1

A series of gels were prepared by stirring different ratios of the two gellants, pyrogenic silica and magnesium silicate, into a triorganic phosphate, tricresyl phosphate, for a short period of time using a high-speed mixer. Comparative examples were also run in which only a single gellant was used and reported as lettered examples A, B, C and D. The compositions of the formulations and test data obtained are listed in table I. Viscosities were determined using a Brookfield Model LVF Viscometer with a No. 4 spindle at 6 and 60 r.p.m. Syneresis losses were determined by placing a weighed amount of gel in an uncoated paper cup and measuring the weight loss after varying periods of time.

EXAMPLE 2

A second series of samples were prepared to show the effect of a surfactant on gel compositions gelled with mixed gellant combinations. The formulations were prepared by mixing the gellants, surfactants and tricresyl phosphate in a high-speed laboratory mixer for a short period of time. The composition details and the viscosity characteristics of the various mixtures of tricresyl phosphate, pyrogenic silica, magnesium silicate and surfactant are found in table II. The comparison example using pyrogenic silica at a single level is included in the tables.

TABLE I

| | Comparison examples | | | | Examples | | | | | | |
|---|---|---|---|---|---|---|---|---|---|---|---|
| | A | B | C | D | 1 | 2 | 3 | 4 | 5 | 6 | 7 |
| Ingredients | | | | | | | | | | | |
| Tricresyl phosphate | 99.75 | 99.5 | 99.0 | 97 | 100 | 100 | 100 | 100 | 100 | 100 | 98.9 |
| Magnesium silicate | 0.25 | 0.5 | 1.0 | | 0.25 | 0.25 | 0.25 | 0.5 | 0.5 | 0.5 | 1.0 |
| Pyrogenic silica | | | | 3 | 1.0 | 2.0 | 3.0 | 1.0 | 2.0 | 3.0 | 0.1 |
| Viscosity properties (cps.): | | | | | | | | | | | |
| Vis. (initial): | | | | | | | | | | | |
| 6 r.p.m | 2,500 | 6,500 | 10,000 | 275 | 3,500 | 6,000 | 6,900 | 6,900 | 7,200 | 9,000 | 31,000 |
| 60 r.p.m | 650 | 1,650 | 2,250 | 220 | 850 | 1,260 | 1,360 | 1,940 | 2,500 | 2,760 | 4,150 |
| Vis. (24 hrs.): | | | | | | | | | | | |
| 6 r.p.m | 2,100 | 10,000 | 14,500 | | | | | 6,500 | 13,500 | 15,500 | |
| 60 r.p.m | 500 | 1,950 | 4,050 | | | | | 1,800 | 2,200 | 2,400 | |
| Vis. (7 days): | | | | | | | | | | | |
| 6 r.p.m | 1,800 | 6,500 | 12,000 | | | | | | | | |
| 60 r.p.m | 450 | 1,650 | 3,900 | | | | | | | | |
| Vis./temp. at 6 r.p.m.: | | | | | | | | | | | |
| 30° C | | | 9,500 | | 2,000 | | | 5,000 | | 10,000 | [1] 28,000 |
| 40° C | | | 9,000 | | 2,000 | | 3,500 | 5,000 | 8,000 | 6,200 | 16,500 |
| 50° C | | | 9,000 | | 1,800 | | 2,500 | 5,000 | 5,000 | 6,000 | |
| 60° C | | | 7,000 | | 1,600 | | 2,500 | 6,500 | 4,000 | 5,500 | 10,000 |
| 70° C | | | 5,500 | | 1,500 | | 4,500 | 7,000 | 6,000 | 7,500 | |
| 80° C | | | 6,000 | | 1,600 | | 4,500 | 7,500 | 7,000 | 9,500 | 4,000 |
| 90° C | | | 4,000 | | 2,000 | | 5,000 | 6,000 | 9,000 | 15,000 | |
| 100° C | | | 4,000 | | 2,000 | | 4,500 | 6,500 | 9,000 | 16,500 | 2,500 |
| 110° C | | | 3,500 | | 2,000 | | 6,500 | 5,500 | 7,500 | 15,000 | |
| 120° C | | | 3,500 | | 2,000 | | 8,500 | 5,500 | 8,500 | 16,000 | 2,000 |
| Syneresis losses (percent): | | | | | | | | | | | |
| 7 days | 16.8 | 22.4 | 15.6 | | 3.1 | 2.7 | 2.9 | 3.3 | 2.3 | 2.3 | |
| 14 days | 37.1 | 37.3 | 23.9 | | 10.0 | 7.9 | 7.7 | 9.1 | 6.1 | 6.4 | |
| 28 days | 65.7 | 49.3 | 29.1 | | 22.5 | 16.7 | 14.6 | 18.1 | 12.6 | 11.3 | |

[1] At 23° C.

TABLE II

| | Comparison examples | | Examples | | | | | |
|---|---|---|---|---|---|---|---|---|
| | E | F | *4 | 8 | 9 | 10 | 11 | 12 |
| Ingredients: | | | | | | | | |
| Tricresyl phosphate | 100 | 100 | 100 | 100 | 100 | 100 | 100 | 100 |
| Pyrogenic silica | 2.5 | 2.5 | 1.0 | 1.0 | 1.0 | 1.0 | 1.0 | 2.5 |
| Magnesium silicate | | | 0.5 | 0.5 | 0.5 | 0.5 | 0.5 | 0.5 |
| Polyoxyethylene sorbitan monooleate | | 2.5 | | 0.33 | 0.67 | 1.0 | 1.7 | 2.5 |
| Viscosity properties (cps.) | | | | | | | | |
| Vis. (initial): | | | | | | | | |
| 6 r.p.m | [1] | 32,000 | 6,900 | 15,500 | 17,600 | 19,500 | 22,000 | 65,000 |
| 60 r.p.m | [1] | 4,850 | 1,940 | 3,050 | 3,400 | 3,500 | 4,150 | 9,350 |
| Vis. (24 hrs.): | | | | | | | | |
| 6 r.p.m | | | | | | | | 65,000 |
| 60 r.p.m | | | | | | | | >10,000 |
| Vis./temp. at 6 r.p.m.: | | | | | | | | |
| 30° C | | 35,000 | 5,000 | | | 20,500 | | 64,000 |
| 40° C | | 33,500 | 5,000 | | | 21,000 | | |
| 50° C | | 29,000 | 5,000 | | | 16,500 | | 87,000 |
| 60° C | | 18,000 | 6,500 | | | 15,500 | | 99,500 |
| 70° C | | | 7,000 | | | 15,500 | | 60,000 |
| 80° C | | | 7,500 | | | 15,000 | | 50,000 |
| 90° C | | 22,000 | 6,000 | | | 18,000 | | 50,000 |
| 100° C | | 22,000 | 6,500 | | | 17,500 | | 52,000 |
| 110° C | | 28,500 | 5,500 | | | 11,000 | | 62,000 |
| 120° C | | 22,000 | 5,500 | | | 11,000 | | 59,000 |
| Syneresis losses (percent): | | | | | | | | |
| 7 days | | | | | | | | |
| 14 days | | | 3.3 | | 22 | | | 4.8 |
| 28 days | | | 9.1 | | 30 | | | 6.7 |
| 35 days | | | 18.1 | | | | | 9.1 |
| 49 days | | | | | | 37.7 | | 11.0 |

[1] No gel.   *4—Repeat of Example 4 in Table I.

The viscosities in the various coating compositions were determined using a Brookfield Viscometer (Model LVF, using the No. 4 spindle at 6 and 60 r.p.m.). The viscosity of the mixtures was also measured at various elevated temperatures using the Brookfield Viscometer Model LVF with a No. 4 spindle at 6 r.p.m.

EXAMPLE 3

Triorganic phosphate coating compositions were prepared from several commercially available triorganic phosphates which were mixed with pyrogenic silica and magnesium silicate. The compositions were prepared as described in example 1. The compositions, ingredients, and Brookfield Viscosities (Model LVF, No. 4 spindle at 6 r.p.m.) at room temperature and various elevated temperatures are presented in table III.

TABLE III

|  | 13 | 14 | 15 | 16 |
|---|---|---|---|---|
| Tricresyl phosphate | 100 | — | — | — |
| Tris(2-butoxyethyl) phosphate | — | 100 | — | — |
| Trioctyl phosphate | — | — | 100 | — |
| Octyl diphenyl phosphate | — | — | — | 100 |
| Pyrogenic silica | 3 | 3 | 3 | 3 |
| Magnesium silicate | 0.5 | 0.5 | 0.5 | 0.5 |
| Viscosity (cps.) 6 r.p.m. | 11,500 | 900 | 1,500 | 2,200 |
| Initial 60 r.p.m. Viscosity | 2,560 | 300 | 480 | 600 |
| (cps. at 6 r.p.m.) 22 T° C. | 15,500 | 900 | 1,500 | 3,000 |
| 40 | 8,500 | 600 | 1,500 | 2,100 |
| 60 | 8,500 | 500 | 3,500 | 2,000 |
| 80 | 14,500 | 500 | 4,000 | 2,000 |
| 100 | 18,000 | 500 | 4,500 | 3,000 |
| 120 | 14,500 | 500 | 3,500 | 3,000 |

EXAMPLE 4

Triorganic phosphate coating compositions were prepared from tricresyl phosphate mixed with pyrogenic silica and magnesium silicate together with small amounts of a surface active agent. The surface active agents evaluated include nonionic surfactants, cationic surfactants, glycols, polyglycols and water. The coating compositions were prepared as described in example 1. The compositions, ingredients, and Brookfield Viscosities (Model LVF using a No. 4 spindle at 6 and 60 r.p.m.) at room temperature are presented in table IV.

TABLE IV

|  | *4 | 17 | 18 | 19 | 20 | 21 |
|---|---|---|---|---|---|---|
| Tricresyl phosphate | 100 | 100 | 100 | 100 | 100 | 100 |
| Pyrogenic silica | 1.0 | 1.0 | 1.0 | 1.0 | 1.0 | 1.0 |
| Magnesium silicate | 0.5 | 0.5 | 0.5 | 0.5 | 0.5 | 0.5 |
| Water | | 1.0 | | | | |
| Ethylene glycol | | | 1.0 | | | |
| Polyethylene glycol (400 molecular wt.) | | | | 1.0 | | |
| Glycerol | | | | | 1.0 | |
| Tetraethylammonium bromide | | | | | | 1.0 |
| Viscosity (cps.), room temp.: | | | | | | |
| 6 r.p.m. | 6,900 | 48,000 | 30,000 | 22,000 | 40,000 | 32,000 |
| 60 r.p.m. | 1,940 | 8,000 | 5,800 | 2,900 | 5,300 | 3,500 |

*Example 4 from Table I.

EXAMPLE 5

A series of coating compositions containing cresyl diphenyl phosphate gelled with pyrogenic silica and magnesium silicate, with and without a surfactant, were prepared according to the procedure of example 2. The composition details and viscosity characteristics of the various compositions are included in table V. The viscosities of the various compositions were determined at room temperature, using a Brookfield Viscometer, (Model LVF using a No. 4 spindle at 6 and 60 r.p.m.).

TABLE V

|  | 22 | 23 | 24 | 25 |
|---|---|---|---|---|
| Cresyl diphenyl phosphate | 97.5 | 97.25 | 97.0 | 96.5 |
| Pyrogenic silica | 2.0 | 2.0 | 2.0 | 2.0 |
| Magnesium silicate | 0.5 | 0.5 | 0.5 | 0.5 |
| Polyoxyethylene sorbitan monooleate | — | 0.25 | 0.5 | 1.0 |
| Viscosity, room temp. cps. 6 r.p.m. | 6,500 | 46,000 | 51,000 | 54,000 |
| 60 r.p.m. | 1,650 | 3,800 | 4,000 | 5,150 |

EXAMPLE 6

Coating compositions containing methyl diphenyl phosphate and isodecyl diphenyl phosphate gelled with pyrogenic silica and magnesium silicate, were prepared according to the procedure of example 2. The composition details and viscosity characteristics of the compositions are included in table VI. The viscosities were measured with a Brookfield Viscometer, (Model LVF using a No. 4 spindle at 6 and 60 r.p.m.).

TABLE VI

|  |  | 26 | 27 |
|---|---|---|---|
| Methyl diphenyl phosphate | | 100 | — |
| Isodecyl diphenyl phosphate | | — | 100 |
| Pyrogenic silica | | 3 | 3 |
| Magnesium silicate | | 0.5 | 0.5 |
| Viscosity (cps.) 6 r.p.m. | | 500 | 500 |
| Initial 60 r.p.m. | | 230 | 250 |
| Viscosity (cps. at 6 r.p.m.) | 25 T° C. | 500 | 500 |
| | 40 | 600 | 2,300 |
| | 60 | 700 | 2,000 |
| | 80 | 700 | 5,000 |
| | 100 | 700 | 5,300 |
| | 120 | 600 | 4,500 |

As will be apparent to those skilled in the art, numerous modifications and variations of the embodiments illustrated above may be made without departing from the spirit of the invention or the scope of the following claims.

What is claimed is:

1. A triorganic phosphate composition for viscous-impingement air filters which comprises: (a) 100 parts by weight of a triorganic phosphate of the formula

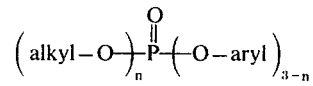

in which $n$ is 0–1, the alkyl radical is one to 10 carbon atoms and the aryl radical is derived from tar acids; (b) 0.1 to 3 parts by weight of substantially pure pyrogenic silica having a particle size not greater than 0.025 microns; and (c) 0.1 to 1.0 parts by weight of magnesium silicate which has at least 10 percent by weight of its particles present as submicron particle sizes in all dimensions and which have a silica to magnesia ($SiO_2:MgO$) ratio between 1.05 to 1 and 1.30 to 1.

2. The coating composition of claim 1 in which the triorganic phosphate is tricresyl phosphate and the pyrogenic silica has a particle size of 0.015 to 0.020 microns.

3. The coating composition of claim 1 further comprising 0.1 to 2.5 percent by weight, based on the total mixture of a material selected from the group consisting of nonionic surfactants, cationic surfactants, glycols, glycerol, polyglycols and water.

* * * * *